United States Patent
Fu et al.

(10) Patent No.: US 9,930,164 B2
(45) Date of Patent: Mar. 27, 2018

(54) METHOD, MOBILE TERMINAL AND SYSTEM FOR PROCESSING SOUND SIGNAL

(71) Applicant: TENCENT TECHNOLOGY (SHENZHEN) COMPANY LIMITED, Shenzhen (CN)

(72) Inventors: Yunlei Fu, Shenzhen (CN); Shujian Yuan, Shenzhen (CN); Yafeng Zhang, Shenzhen (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 247 days.

(21) Appl. No.: 14/715,645

(22) Filed: May 19, 2015

(65) Prior Publication Data

US 2015/0249731 A1    Sep. 3, 2015

Related U.S. Application Data

(63) Continuation of application No. PCT/CN2013/087463, filed on Nov. 20, 2013.

(30) Foreign Application Priority Data

Nov. 22, 2012    (CN) .......................... 2012 1 0479000

(51) Int. Cl.
    *H04M 1/725*    (2006.01)
    *G08C 23/02*    (2006.01)

(52) U.S. Cl.
    CPC .......... *H04M 1/7253* (2013.01); *G08C 23/02* (2013.01)

(58) Field of Classification Search
    CPC .............................. H04M 1/725; G08C 23/02
    See application file for complete search history.

(56) References Cited

U.S. PATENT DOCUMENTS

2008/0025477 A1*  1/2008  Farhan ................... G06Q 50/22
                                                            379/38
2008/0118076 A1*  5/2008  Ohkubo ................... A61B 7/04
                                                            381/67

(Continued)

FOREIGN PATENT DOCUMENTS

CN        101308602 A       11/2008
CN        101312040 A       11/2008

(Continued)

OTHER PUBLICATIONS

International Search Report for International Application No. PCT/CN2013/087463 dated Feb. 27, 2014.

(Continued)

*Primary Examiner* — Bobbak Safaipour
(74) *Attorney, Agent, or Firm* — Harness, Dickey & Pierce, P.L.C.

(57) ABSTRACT

A system for processing a sound signal includes a mobile terminal that obtains a series of sound waveform values in a first location. The mobile terminal obtains a sound waveform value within a valid sound waveform value range from the series of sound waveform values and transmits the sound waveform value to a computing device in a second location, so that the computing device performs a logic operation corresponding to the sound waveform value. A mobile terminal can transmit a sound waveform value to a computing device at a location remote from the mobile terminal to perform a logic operation corresponding to the sound waveform value, and total system performance, including the computing device and the mobile terminal, is improved.

14 Claims, 3 Drawing Sheets

S101 — A mobile terminal obtains a series of sound waveform values continuously in a first location S102 — A sound waveform value within a preset valid sound waveform value range is obtained from the series of sound waveform values obtained at block 101, and is transmitted to the service side in a second location, so that the service side may perform a logic operation corresponding to the sound waveform value

(56) References Cited

U.S. PATENT DOCUMENTS

| | | | | |
|---|---|---|---|---|
| 2012/0025958 A1* | 2/2012 | Chuang | ............... | G08C 17/02 340/12.22 |
| 2012/0131462 A1 | 5/2012 | Chen | | |
| 2013/0141551 A1* | 6/2013 | Kim | ............... | H04N 5/445 348/51 |
| 2014/0134918 A1* | 5/2014 | Kweon | ............... | A63H 5/00 446/484 |
| 2015/0040740 A1* | 2/2015 | Setoguchi | ............... | G10H 1/18 84/603 |

FOREIGN PATENT DOCUMENTS

| | | |
|---|---|---|
| CN | 102111314 A | 6/2011 |
| CN | 102479024 A | 5/2012 |
| CN | 102625007 A | 8/2012 |
| JP | 2012185698 A | 9/2012 |

OTHER PUBLICATIONS

Chinese Office Action for Application No. 2012104790005 dated Nov. 22, 2012, and an English concise explanation of relevance thereof.

International Preliminary Report for Application No. PCT/CN2013/087463 dated Jun. 4, 2015.

\* cited by examiner

METHOD, MOBILE TERMINAL AND SYSTEM FOR PROCESSING SOUND SIGNAL

CROSS-REFERENCE TO RELATED APPLICATIONS

This application is a continuation of International Application No. PCT/CN2013/087463, filed Nov. 20, 2013. This application claims the benefit and priority of Chinese Application No. 201210479000.5, filed Nov. 22, 2012. The entire disclosures of each of the above applications are incorporated herein by reference.

FIELD

The present disclosure relates to a method, mobile terminal and system for processing a sound signal.

BACKGROUND

This section provides background information related to the present disclosure which is not necessarily prior art.

In conventional techniques, external sound may trigger personal computers (PC) to perform some logic operations on the PCs, e.g., playing rhythm games, changing songs, changing screensavers. In particular, recording devices or sound input devices are inserted into wired microphone interfaces on the PCs to obtain a series of sound waveform values of the external sound.

SUMMARY

This section provides a general summary of the disclosure, and is not a comprehensive disclosure of its full scope or all of its features.

A method, mobile terminal and system for processing a sound signal is provided according to various embodiments so that a mobile terminal, such as a smartphone, can transmit a sound waveform value to a service side, such as a PC, at a location far away from the mobile terminal to perform a logic operation corresponding to the sound waveform value.

A method for processing a sound signal includes:
 obtaining, by a mobile terminal, a series of sound waveform values in a first location;
 obtaining, by the mobile terminal, a sound waveform value within a valid sound waveform value range from the series of sound waveform values; and
 transmitting, by the mobile terminal, the sound waveform value to a service side in a second location, so that the service side performs a logic operation corresponding to the sound waveform value.

A mobile terminal includes:
 an obtaining module, to obtain a series of sound waveform values in a first location;
 a transmitting module, to obtain a sound waveform value within a valid sound waveform value range from the series of sound waveform values, transmit the sound waveform value to a service side in a second location, so that the service side performs a logic operation corresponding to the sound waveform value.

A system for processing a sound signal includes a mobile terminal and a service side, wherein the mobile terminal includes:
 an obtaining module, to obtain a series of sound waveform values in a first location;
 a transmitting module, to obtain a sound waveform value within a valid sound waveform value range from the series of sound waveform values, transmit the sound waveform value to a service side in a second location, so that the service side performs a logic operation corresponding to the sound waveform value; and
 a service side, to configure the valid sound waveform value range for the mobile terminal, perform a logic operation corresponding to the sound waveform value.

Further areas of applicability will become apparent from the description provided herein. The description and specific examples in this summary are intended for purposes of illustration and are not intended to limit the scope of the present disclosure.

DRAWINGS

The drawings described herein are for illustrative purposes of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

According to various embodiments, a mobile terminal obtains a series of sound waveform values from the environment, picks out a sound waveform value that is within a preset sound waveform value range from the series of sound waveform values, and transmits the sound waveform value to a service side to control operation of the service side. The service side may perform a logic operation corresponding to the sound waveform value. Thus, a user can control the logic operation on the service side through his/her sound at a location far away from the service side, so as to play interesting games or other applications continuously.

The service side according to various embodiments may be a computing device that can provide a service, e.g., playing rhythm games, changing songs, changing screensavers. The computing device may be a PC, a server, and so on.

A mobile terminal such as a smartphone e.g., an Android phone having an acoustic sensor (e.g., microphone) is one example according to various embodiments. By using the acoustic sensor on the mobile terminal, the mobile terminal can interact with a service side, wherein several operations can be performed. For example, a user can play rhythm games, change songs, change screensavers etc. The mobile terminal transmits an obtained sound waveform value of environment sound to the service side and the service side performs a logic operation corresponding to the sound waveform value within the sound waveform value range of specific Decibel thresholds.

According to various embodiments, the mobile terminal may be a smartphone and the service side may be a PC.

Figure 1:
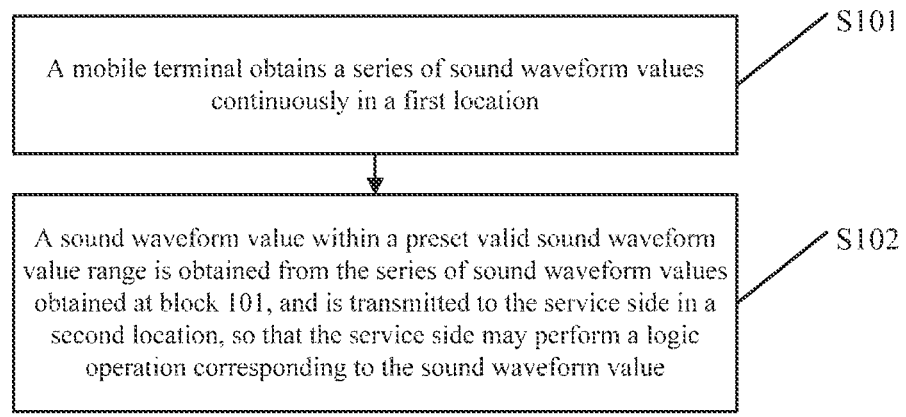
FIG. 1 is a flowchart illustrating a method for processing a sound signal according to various embodiments.

As shown in FIG. 1, a method for processing a sound signal is provided according to various embodiments.

S101: A mobile terminal obtains a series of sound waveform values continuously in a first location. According to various embodiments, an Android smartphone is an example of the mobile terminal and a PC is an example of a service side. According to various embodiments, an acoustic sensor on the mobile terminal may obtain the series of sound waveform values continuously to trigger the PC. The mobile terminal and the PC may be connected in a wireless manner, such as Bluetooth or WIFI, and on the like. That is, there is a wireless connection between the mobile terminal and the PC. According to various embodiments, the terminal device obtains the series of sound waveform values continuously. Obtaining includes configuring a sound recorder via setting a sampling rate, e.g., 8000 Hz and a quality parameter, e.g., 16 Digital Sound of the sound recorder and obtaining the sound waveform values continuously via a buffering service thread in the sound recorder.

S102: One or more sound waveform values within a preset valid sound waveform value range are picked out from the series of sound waveform values obtained at block 101 and are transmitted to the service side in a second location, so that the service side may perform a logic operation corresponding to the one or more sound waveform values.

According to various embodiments, a sound waveform value may be a value that can indicate characteristics of the sound such as size, timbre, pitch and so on. The sound wave value may be a 16 bit integer or an 8 bit integer. The logic operation performed by the PC refers to the operation of playing rhythm games, changing songs, changing screensavers, and so on. The first location is far away from the second location; thus, the user in the first location may not directly control the PC in the second location to perform the logic operation. For example, the user in the first location may not use a mouse or a keyboard directly in the PC in the second location.

The preset valid sound waveform value range is defined via a first preset threshold and a second preset threshold. The one or more sound waveform values within the preset valid sound waveform value range are greater than the first preset threshold, and are less than the second preset threshold. According to various embodiments, when the one or more sound waveform value within the preset valid sound waveform value range is selected from the series of sound waveform values obtained at block 101, an indication may be transmitted to the service side, wherein the indication may direct the service side to perform the logic operation corresponding to the sound waveform value. The mobile terminal obtains the one or more sound waveform values within the preset valid sound waveform value range from the series of sound waveform values obtained at block 101 and transmits the one or more sound waveform values to the PC, so the PC performs the corresponding logic operation corresponding to the one or more sound waveform values.

Figure 6:
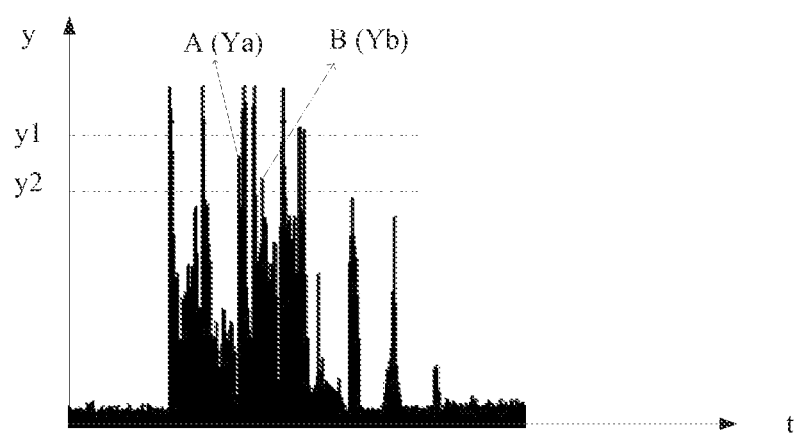
FIG. 6 is a diagram illustrating a sound waveform curve according to various embodiments.

FIG. 6 is a diagram illustrating a sound waveform curve according to various embodiments. A vertical axis (y axis) represents sound waveform values of sound waveform points in the sound waveform curve. The preset valid sound waveform value range of knocking a desk is [10272, 10320].

That is, the first preset threshold y2 of the preset valid sound waveform value range is 10272 and the second preset threshold y1 of the preset valid sound waveform value range is 10320. The sound waveform value Ya of sound waveform point A and the sound waveform value Yb of sound waveform point B in the sound waveform in FIG. 6 are greater than the first preset threshold y2 and are less than the second preset threshold y1. Thus, the sound waveform values Ya and Yb are selected from the series of sound waveform values in the sound waveform curve, and are transmitted to the service side in a second location, so that the service side may perform a logic operation corresponding to the sound waveform values Ya and Yb.

The preset valid sound waveform value range for specific sound via the first preset threshold and the second preset threshold may be configured by the PC. When selecting the one or more sound waveform values within the preset valid sound waveform value range, the mobile terminal notifies the PC to perform the logic operation corresponding to the one or more sound waveform values. For example, the PC configures the valid sound waveform value range for pounding a table and transmits the valid sound waveform value range of pounding the table to the mobile terminal. After picking out the sound waveform value within the preset valid sound waveform value range of pounding the table, the mobile terminal transmits the one or more sound waveform values to the PC and the PC performs the corresponding logic operation. Thus, a user can control the logic operation on the PC through his/her sound at a location far away from the PC, so as to play games or other applications continuously. Thus, user experience is improved. For example, the user can play a rhythm game, change a song through pounding the table or change a screensaver on the PC through pounding the table at a location far away from the PC.

Figure 2:
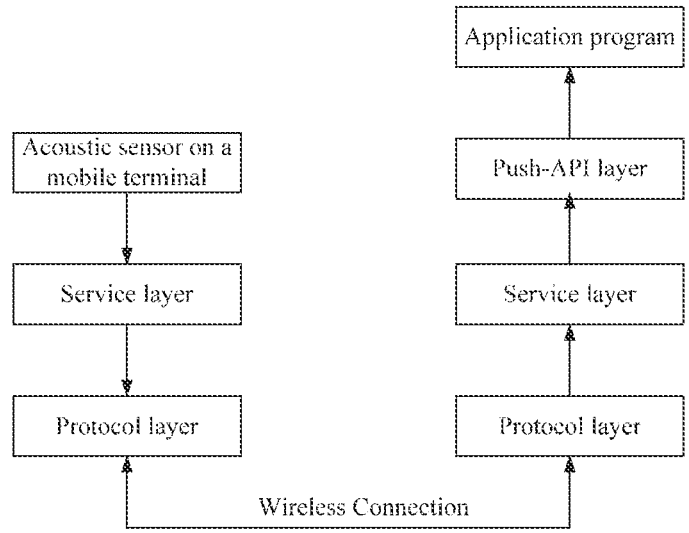
FIG. 2 is a diagram illustrating the processing of a sound signal according to various embodiments.

FIG. 2 is a diagram illustrating a method for processing a sound signal according to various embodiments.

As shown in FIG. 2, a mobile terminal and a service side (e.g. a PC) are connected wirelessly. Both a service layer and a protocol layer are configured respectively in the mobile terminal and the PC. According to various embodiments, google open Source protobuf may be used as a protocol layer encoder to take charge of encoding a protocol layer.

The mobile terminal opens a thread for obtaining a sound buffer to continuously obtain a series of sound waveform values in the sound buffer. Afterwards, the mobile terminal transmits one or more specific sound waveform values to the PC through a wireless connection. The PC maintains the wireless connection through a service and continuously encapsulates the one or more sound waveform values transmitted from a protocol layer and passes the one or more sound waveform values to upper layers. Push-api in the PC is used to edit the one or more sound waveform values obtained by the service layer to one or more push parameters and transmit the one or more push parameters to each callback application program registered in the Push-api to perform a corresponding logic operation.

By using the above approach according to various embodiments, the series of sound waveform values can be obtained continuously through the acoustic sensor in the mobile terminal at a location far away from the PC. The preset valid sound waveform value range can be configured to the mobile terminal by the PC. When picking out one or more sound waveform values within the sound waveform value range, the mobile terminal notifies the PC to perform a corresponding logic operation. For example, through pounding a table, a user can play rhythm games, change songs, and change screensavers on the PC. Thus, total system performance of both the service side and the mobile terminal is improved. Accordingly, user experience is improved.

Figure 3:
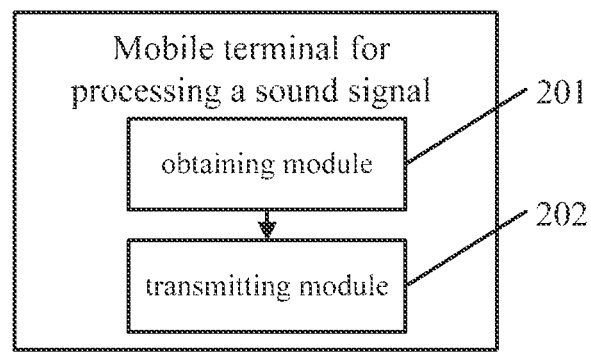
FIG. 3 is a diagram illustrating a structure of a terminal device for processing a sound signal according to various embodiments.
Figure 4:
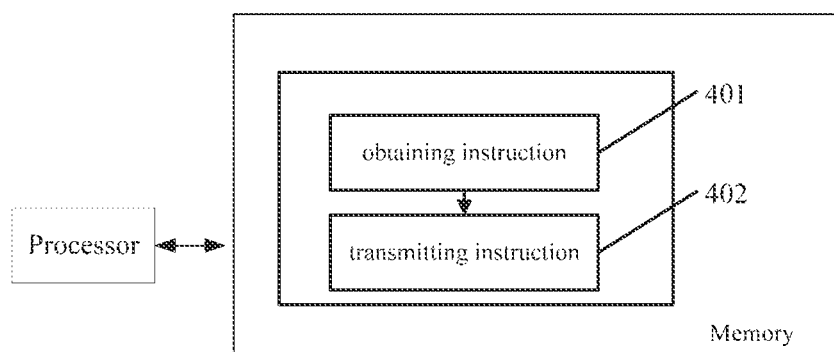
FIG. 4 is a diagram illustrating a structure of a terminal device for processing a sound signal according to various embodiments.

FIG. 3 is a diagram illustrating a structure of a mobile terminal for processing an audio signal according to various embodiments. The mobile terminal includes an obtaining module 201 and a transmitting module 202. The obtaining module 201 obtains a series of sound waveform values in a first location. The transmitting module 202 obtains one or more sound waveform values within a valid sound waveform value range from the series of sound waveform values and transmits the one or more sound waveform values to a service side in a second location, so that the service side performs a logic operation corresponding to the one or more sound waveform value.

According to various embodiments, an Android smartphone is an example of the mobile terminal and a PC is an example of a service side. According to various embodiments, an acoustic sensor on the mobile terminal may obtain the series of sound waveform values continuously to trigger the PC. The mobile terminal and the PC may be connected in a wireless manner such as Bluetooth or WIFI and the like. That is, there is a wireless connection between the mobile terminal and the PC.

According to various embodiments, the obtaining module 201 obtains the series of sound waveform values continuously. The obtaining module 201 obtains the series of sound waveform values continuously which includes configuring a sound recorder via setting a sampling rate, e.g., 8000 Hz and a quality parameter, e.g., 16 Digital Sound of the sound recorder and obtaining the sound waveform values continuously via a buffering service thread in the sound recorder. The transmitting module 202 obtains the one or more sound waveform values within the valid sound waveform value range from the series of sound waveform values and transmits the one or more sound waveform values to the service side in a second location so that the service side performs the logic operation corresponding to the one or more sound waveform value.

A sound waveform value refers to a value that indicates characteristics of the sound such as size, timbre, pitch, and so on. The sound wave value may be set as a 16 bit integer or 8 bit integer. The logic operation performed by the PC refers to the operation such as playing rhythm games, changing songs, changing screensavers, and so on. The first location is far away from the second location, thus, the user in the first location may not directly control the PC in the second location to perform the logic operation. For example, the user in the first location may not use a mouse or a keyboard directly in the PC in the second location.

The preset valid sound waveform value range is defined via a first preset threshold and a second preset threshold. The one or more sound waveform values within the preset valid sound waveform value range are greater than the first preset threshold and are less than the second preset threshold. According to various embodiments, the first preset threshold of the preset valid sound waveform value range of knocking a desk is 10272 and the second preset threshold of the preset valid sound waveform value range of knocking a desk is 10320.

The preset valid sound waveform value range for specific sound via the first preset threshold and the second preset threshold may be configured by the PC. When the obtaining module 201 obtains the one or more sound waveform values within the preset valid sound waveform value range, the mobile terminal notifies the PC to perform the logic operation corresponding to the one or more sound waveform values. For example, the PC configures the valid sound waveform value range for pounding a table and transmits the valid sound waveform value range of pounding the table to the mobile terminal. After obtaining the one or more sound waveform values within the preset sound waveform value range of pounding the table, the mobile terminal transmits the one or more sound waveform values to the PC. The PC performs the corresponding logic operation. A user can control the logic operation on the PC through his/her sound at a location far away the PC, so as to play interesting games or other applications continuously. Thus, user experience is improved. For example, the user can play a rhythm game, change a song through pounding the table or change a screensaver on the PC through pounding the table at a location far away from the PC.

Processing a sound signal according to various embodiments is as shown in FIG. 2. A mobile terminal and a service side (e.g. a PC) are connected wirelessly. Both a service layer and a protocol layer are configured respectively in the mobile terminal and the PC. According to various embodiments, google open Source protobuf may be used as a protocol layer encoder to take charge of encoding a protocol layer.

The mobile terminal opens a thread for obtaining a sound buffer to continuously obtain a series of sound waveform values in the sound buffer. Afterwards, the mobile terminal transmits one or more specific sound waveform values to the PC through a wireless connection. The PC maintains the wireless connection through a service, continuously encapsulates the one or more sound waveform values transmitted from a protocol layer and passes the one or more sound waveform values to upper layers.

Push-api in the PC is used to edit the one or more sound waveform values obtained by the service layer to one or more push parameters and transmit the one or more push parameters to each callback application program registered in the Push-api to perform a corresponding logic operation.

By using the above technical method according to various embodiments, the series of sound waveform values can be obtained continuously through the acoustic sensor in the mobile terminal at a location far away from the PC. The preset valid sound waveform value range can be configured to the mobile terminal by the PC. When picking out one or more sound waveform values within the sound waveform value range, the mobile terminal notifies the PC to perform a corresponding logic operation. For example, through pounding a table a user can play rhythm games, change songs, and change screensavers on the PC. Thus, total system performance of both the service side and the mobile terminal is improved. Accordingly, user experience is improved.

The methods and modules described herein may be implemented by hardware, machine-readable instructions or a combination of hardware and machine-readable instructions. Machine-readable instructions used in the examples disclosed herein may be stored in storage medium readable by multiple processors, such as hard drive, CD-ROM, DVD, compact disk, floppy disk, magnetic tape drive, RAM, ROM or other proper storage device. Or, at least part of the machine-readable instructions may be substituted by specific-purpose hardware, such as custom integrated circuits, gate array, FPGA, PLD and specific-purpose computers, and so on.

FIG. 3 is a diagram illustrating a structure of a mobile terminal for processing an audio signal according to various embodiments. The mobile terminal includes a processor for executing instructions stored in a memory and the instructions. The instructions include an obtaining instruction 401 and a transmitting instruction 402. The obtaining instruction 401 obtains a series of sound waveform values in a first location. The transmitting instruction 402 obtains one or more sound waveform values within a valid sound waveform value range from the series of sound waveform values and transmits the one or more sound waveform values to a service side in a second location so that the service side performs a logic operation corresponding to the one or more sound waveform value.

According to various embodiments, an Android smartphone is an example of the mobile terminal and a PC is an example of a service side. According to various embodiments, an acoustic sensor on the mobile terminal may obtain the series of sound waveform values continuously to trigger the PC. The mobile terminal and the PC may be connected in a wireless manner such as Bluetooth or WIFI and on the like. That is, there is a wireless connection between the mobile terminal and the PC.

According to various embodiments, the obtaining instruction 401 obtains the series of sound waveform values continuously. In detail, the obtaining instruction 401 obtains the series of sound waveform values continuously, which includes configuring a sound recorder via setting a sampling rate, e.g., 8000 Hz and a quality parameter, e.g., 16 Digital Sound of the sound recorder and obtaining the sound waveform values continuously via a buffering service thread in the sound recorder.

The transmitting instruction 402 obtains the one or more sound waveform values within the valid sound waveform value range from the series of sound waveform values and transmits the one or more sound waveform values to the service side in a second location so that the service side performs the logic operation corresponding to the one or more sound waveform value.

A sound waveform value refers to a value that can indicate characteristics of the sound such as size, timbre, pitch, and so on. The sound wave value may be set as a 16 bit integer or 8 bit integer. The logic operation performed by the PC refers to the operation such as playing rhythm games, changing songs, changing screensavers, and so on. The first location is far away from the second location, thus, the user in the first location may not directly control the PC in the second location to perform the logic operation. For example, the user in the first location may not use a mouse or a keyboard directly in the PC in the second location.

The preset valid sound waveform value range is defined via a first preset threshold and a second preset threshold. The one or more sound waveform values within the preset valid sound waveform value range are greater than the first preset threshold, and are less than the second preset threshold. In an example, the first preset threshold of the preset valid sound waveform value range of knocking a desk is 10272, and the second preset threshold of the preset valid sound waveform value range of knocking a desk is 10320.

The preset valid sound waveform value range for specific sound via the first preset threshold and the second preset threshold may be configured by the PC. When the obtaining instruction 401 obtains the one or more sound waveform values within the preset valid sound waveform value range, the mobile terminal notifies the PC to perform the logic operation corresponding to the one or more sound waveform values. For example, the PC configures the valid sound waveform value range for pounding a table and transmits the valid sound waveform value range of pounding the table to the mobile terminal. After obtaining the one or more sound waveform values within the preset sound waveform value range of pounding the table, the mobile terminal transmits the one or more sound waveform values to the PC. The PC performs the corresponding logic operation. Thus, a user can control the logic operation on the PC through his/her sound at a location far away the PC, so as to play interesting games or other applications continuously. Thus, user experience is improved. For example, the user can play a rhythm game, change a song through pounding the table or change a screensaver on the PC through pounding the table at a location far away from the PC.

Figure 5:
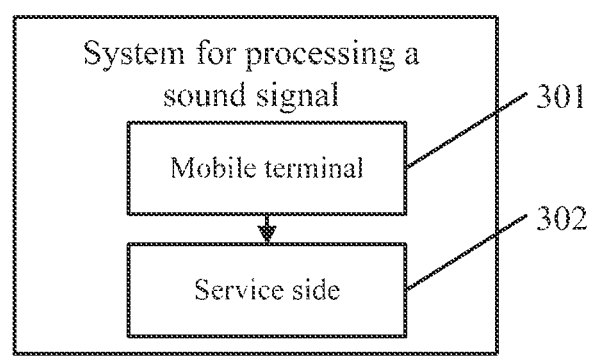
FIG. 5 is a diagram illustrating a structure of a system for processing a sound signal according to various embodiments.

FIG. 5 is a diagram illustrating a structure of a system for processing an audio signal according to various embodiments. The system includes a mobile terminal 301 and a service side 302. The mobile terminal 301 may be a mobile terminal as described in the examples above. The service side 302 may be a service side as described in the examples above. The mobile terminal 301 and the service side 302 may interact with each other. A method in which the mobile terminal 301 obtains sound waveform values and triggers the service side 302 to perform a logic operation is the same as that in the example above, which is not described repeatedly herein.

The foregoing are examples of the present disclosure. It should be noted that those skilled in the art may make improvement and modification within the principle of the present disclosure, and the improvement and modification should be covered in the protection scope of the disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

What is claimed is:

1. A method for processing a sound signal, comprising:
   obtaining, by a mobile terminal, a series of sound waveform values in a first location, wherein each of the series of sound waveform values indicates characteristics of sound;
   obtaining, by the mobile terminal, a sound waveform value within a valid sound waveform value range from the series of sound waveform values; and
   transmitting, by the mobile terminal, the sound waveform value to a computing device in a second location, wherein the computing device performs a logic operation corresponding to the sound waveform value, encapsulates the sound waveform value transmitted from the mobile terminal, edits the sound waveform value into a push parameter, and transmits the push parameter to a corresponding program.

2. The method according to claim 1, wherein obtaining the series of sound waveform values comprises:
configuring, by the mobile terminal, a sound recorder via setting a sampling rate and a sound parameter of the sound recorder; and
obtaining, by the mobile terminal, the series of sound waveform values continuously via a buffering service thread in the sound recorder.

3. The method according to claim 1, wherein obtaining the sound waveform value within the valid sound waveform value range comprises:
picking out the sound waveform value that is greater than a first threshold and less than a second threshold from the series of sound waveform values by the mobile terminal, wherein the valid sound waveform value range is defined via the first threshold and the second threshold.

4. The method according to claim 1, further comprising:
obtaining, by the mobile terminal, the valid sound waveform value range from the computing device.

5. The method according to claim 1, wherein transmitting the sound waveform value to the computing device comprises:
transmitting, by the mobile terminal, the sound waveform value to the computing device through a wireless connection between the mobile terminal and the computing device.

6. A mobile terminal, comprising:
a processor for executing instructions stored in a non-transitory machine readable storage medium to:
obtain a series of sound waveform values in a first location, wherein each of the series of sound waveform values indicates characteristics of sound; and
obtain a sound waveform value within a valid sound waveform value range from the series of sound waveform values, transmit the sound waveform value to a computing device in a second location, wherein the computing device performs a logic operation corresponding to the sound waveform value, encapsulates the sound waveform value transmitted from the mobile terminal, edits the sound waveform value into a push parameter, and transmits the push parameter to a corresponding program.

7. The mobile terminal according to claim 6, wherein the instructions stored in the non-transitory machine readable storage medium cause the processor to:
configure a sound recorder via setting a sampling rate, a sound parameter of the sound recorder, obtain the series of sound waveform values continuously via a buffering service thread in the sound recorder.

8. The mobile terminal according to claim 6, wherein the instructions stored in the non-transitory machine readable storage medium cause the processor to:
pick out the sound waveform value that is more than a first threshold and less than a second threshold from the series of sound waveform values by the mobile terminal, wherein the valid sound waveform value range is defined via the first threshold and the second threshold.

9. The mobile terminal according to claim 6, wherein the instructions stored in the non-transitory machine readable storage medium further cause the processor to:
obtain the valid sound waveform value range from the computing device.

10. The mobile terminal according to claim 6, wherein the instructions stored in the non-transitory machine readable storage medium cause the processor to:
transmit the sound waveform value to the computing device through a wireless connection between the mobile terminal and the computing device.

11. A system for processing a sound signal, comprising:
a mobile terminal, including:
a processor for executing instructions stored in a non-transitory machine readable storage medium to:
obtain a series of sound waveform values in a first location wherein each of the series of sound waveform values indicates characteristics of sound; and
obtain a sound waveform value within a valid sound waveform value range from the series of sound waveform values, transmit the sound waveform value to a computing device in a second location, so that the computing device performs a logic operation corresponding to the sound waveform value; and
a computing device, including:
a processor for executing instructions stored in a non-transitory machine readable storage medium to:
configure the valid sound waveform value range for the mobile terminal, perform a logic operation corresponding to the sound waveform value,
encapsulate the sound waveform value transmitted from the mobile terminal, edit the sound waveform value into a push parameter, and transmits the push parameter to a corresponding program.

12. The system according to claim 11, wherein the instructions stored in the non-transitory machine readable storage medium of the mobile terminal cause the processor to:
configure a sound recorder via setting a sampling rate, a sound parameter of the sound recorder, obtain the series of sound waveform values continuously via a buffering service thread in the sound recorder.

13. The system according to claim 11, wherein the instructions stored in the non-transitory machine readable storage medium of the mobile terminal cause the processor to:
pick out the sound waveform value that is more than a first threshold and less than a second threshold from the series of sound waveform values by the mobile terminal, wherein the valid sound waveform value range is defined via the first threshold and the second threshold.

14. The system according to claim 11, wherein the instructions stored in the non-transitory machine readable storage medium of the mobile terminal cause the processor to:
obtain the valid sound waveform value range from the computing device.

* * * * *